US012606367B2

(12) United States Patent
Tian et al.

(10) Patent No.: US 12,606,367 B2
(45) Date of Patent: Apr. 21, 2026

(54) APPARATUS AND METHOD FOR HANDLING TWISTLOCKS

(71) Applicant: ABB Schweiz AG, Baden (CH)

(72) Inventors: Ye Tian, Shanghai (CN); Jiafan Zhang, Shanghai (CN)

(73) Assignee: ABB Schweiz AG, Baden (CH)

( * ) Notice: Subject to any disclaimer, the term of this patent is extended or adjusted under 35 U.S.C. 154(b) by 340 days.

(21) Appl. No.: 18/248,589

(22) PCT Filed: Nov. 11, 2020

(86) PCT No.: PCT/CN2020/128155
§ 371 (c)(1),
(2) Date: Apr. 11, 2023

(87) PCT Pub. No.: WO2022/099513
PCT Pub. Date: May 19, 2022

(65) Prior Publication Data
US 2023/0382637 A1      Nov. 30, 2023

(51) Int. Cl.
*B65D 90/00*          (2006.01)
*B25J 5/00*           (2006.01)
*B25J 15/00*          (2006.01)
*B25J 19/02*          (2006.01)

(52) U.S. Cl.
CPC ............ *B65D 90/002* (2013.01); *B25J 5/007* (2013.01); *B25J 15/0033* (2013.01); *B25J 19/023* (2013.01)

(58) Field of Classification Search
CPC ..... B65D 90/002; B25J 5/007; B25J 15/0033;
B25J 19/023; B25J 5/02; B25J 9/0093;
B25J 9/1679; B25J 9/1697; G05B
2219/40252; G05B 2219/40298; B60P
7/132
See application file for complete search history.

(56) References Cited

U.S. PATENT DOCUMENTS 6,688,249 B1 *   2/2004  Klein Breteler ... B65D 90/0013
                                                114/75
9,611,126 B2 *   4/2017  Holmberg ............... G06F 18/22
2012/0288349 A1  11/2012  Bohman
(Continued)

FOREIGN PATENT DOCUMENTS

CN       102428013 A    4/2012
CN       105431370 A    3/2016
(Continued)

*Primary Examiner* — Sihar A Karwan
(74) *Attorney, Agent, or Firm* — Greenberg Traurig, LLP

(57) ABSTRACT

An apparatus and a method for handling twistlocks configured to lock a container onto a vehicle. The apparatus includes a gripper configured to grip one of the twistlocks to be mounted onto or dismounted from a corner fitting of a container. Further, the apparatus has a visual sensor configured to capture a first image of the corner fitting when the vehicle is moving in a twistlock handling station. The apparatus includes a control unit configured to obtain, from the visual sensor, the first image make some determinations based on the first image; and send a handling position such that the gripper moves to the handling position to handle the one of the twistlocks during the moving of the vehicle.

18 Claims, 6 Drawing Sheets

(56)         References Cited

U.S. PATENT DOCUMENTS

| | | | |
|---|---|---|---|
| 2014/0067188 A1* | 3/2014 | Mian | ........................ B25J 5/005 |
| | | | 701/28 |
| 2016/0313739 A1 | 10/2016 | Mian | |
| 2021/0292110 A1 | 9/2021 | Wang et al. | |
| 2023/0356413 A1* | 11/2023 | Tian | ..................... B25J 15/0033 |
| 2023/0382636 A1* | 11/2023 | Tian | ..................... B65D 90/002 |
| 2023/0382637 A1* | 11/2023 | Tian | ..................... B25J 15/0033 |

FOREIGN PATENT DOCUMENTS

| | | | |
|---|---|---|---|
| CN | 105700530 | A | 6/2016 |
| CN | 107857071 | A | 3/2018 |
| CN | 107857134 | A | 3/2018 |
| CN | 109267773 | A | 1/2019 |
| CN | 109319317 | A | 2/2019 |
| CN | 110482268 | A | 11/2019 |
| WO | 2012141658 | A2 | 10/2012 |
| WO | 2015022001 | A1 | 2/2015 |
| WO | 2019007318 | A1 | 1/2019 |
| WO | 2019028060 | A2 | 2/2019 |
| WO | 2019100097 | A1 | 5/2019 |
| WO | 2020009656 | A1 | 1/2020 |

* cited by examiner

800

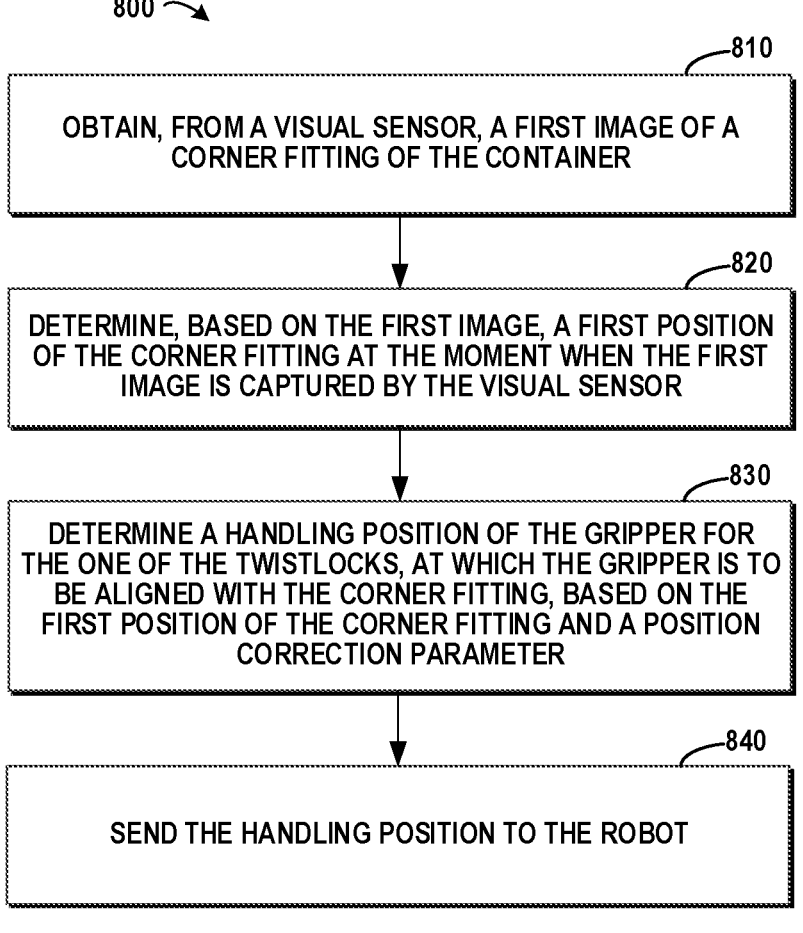

810

OBTAIN, FROM A VISUAL SENSOR, A FIRST IMAGE OF A
CORNER FITTING OF THE CONTAINER

820

DETERMINE, BASED ON THE FIRST IMAGE, A FIRST POSITION
OF THE CORNER FITTING AT THE MOMENT WHEN THE FIRST
IMAGE IS CAPTURED BY THE VISUAL SENSOR

830

DETERMINE A HANDLING POSITION OF THE GRIPPER FOR
THE ONE OF THE TWISTLOCKS, AT WHICH THE GRIPPER IS TO
BE ALIGNED WITH THE CORNER FITTING, BASED ON THE
FIRST POSITION OF THE CORNER FITTING AND A POSITION
CORRECTION PARAMETER

840

SEND THE HANDLING POSITION TO THE ROBOT

FIG. 8

900
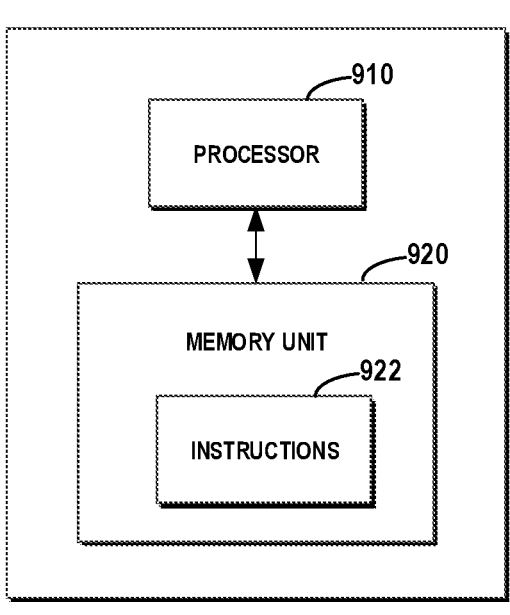
FIG. 9

APPARATUS AND METHOD FOR HANDLING TWISTLOCKS

CROSS-REFERENCE TO RELATED APPLICATIONS

This [is a national stage application claiming priority to International patent application Serial No.: PCT/CN2020/128155, filed on Nov. 11, 2020; which is herein incorporated by reference in its entirety.

FIELD

Example embodiments of the present disclosure generally relate to the field of twistlock handling, and more specifically, to an apparatus and a method for handling twistlocks on a moving vehicle with robots.

BACKGROUND

Twistlocks are commonly used together with a shipping container to for example lock the container onto a truck or a ship. Upon loading the container from the truck onto the ship, the container needs to be unlocked from the truck through handling the twistlocks first, and is then transferred from the truck onto the ship. Upon unloading the container from the ship, the container needs to be locked onto the truck through handling the twistlocks after being transferred onto the truck. Modern ports aim to realize high efficiency and automation of container loading and unloading. However, twistlock handling becomes a stumbling block for such an automation process.

Using robots to mount or dismount the twistlocks at the corners of the container is a feasible solution for automatic twistlock handling. FIG. 1 illustrates a conventional process for handling twistlocks on a vehicle 1 in a twistlock handling station 3. At each side of the vehicle 1, three twistlocks (not shown) are provided, including two side twistlocks and one middle twistlock, so as to lock the container 4 onto the vehicle 1. As shown in the left part of FIG. 1, the vehicle 1 drives into the twistlock handling station 3. At each side of the twistlock handling station 3, three robots 2 are fixed on the ground so as to handle the corresponding twistlocks. Then, as shown in the central part of FIG. 1, the vehicle 1 stops at an appropriate position at which the robots 2 at each side of the vehicle 1 handle the corresponding twistlocks, e.g., dismounting the twistlocks from the vehicle 1 or mounting the twistlocks onto the vehicle 1. After the handling of the twistlocks is completed, the vehicle 1 drives out of the twistlock handling station 3, as shown in the right part of FIG. 1.

The above conventional solution for handling the twistlocks with the robots 2 has several defects to be improved. On one hand, as shown in FIG. 1, the handling of the twistlocks is discrete in time. The vehicle 1 drives into the twistlock handling station 3, stops at the appropriate position and waits for the robots 2 to handle the twistlocks. After the handling of all the twistlocks is completed, the vehicle 1 drives out of the twistlock handling station 3. To handle all the twistlocks synchronously, each side of the vehicle 1 would be provided with no less than three robots, which would result in a huge cost. On the other hand, the twistlock handling station 3 would occupy a large area. As shown in FIG. 1, the total length of the twistlock handling station 3 is about three times the length of the container 4, which will lead to a large turning circle of the moving path of the vehicle 1 and lower entire quay efficiency.

Thus, there is a need for an improved solution for twistlock handling with robots.

SUMMARY

In view of the foregoing problems, example embodiments of the present disclosure provide solutions for handling twistlocks with robots.

In a first aspect, example embodiments of the present disclosure provide an apparatus for handling twistlocks configured to lock a container onto a vehicle. The apparatus comprises a robot comprising a gripper configured to grip one of the twistlocks to be mounted onto or dismounted from a corner fitting of the container; a visual sensor arranged on the robot and configured to capture a first image of the corner fitting when the vehicle is moving in a twistlock handling station; and a control unit. The control unit is configured to obtain, from the visual sensor, the first image of the corner fitting; determine, based on the first image, a first position of the corner fitting at the moment when the first image is captured by the visual sensor; determine a handling position of the gripper for the one of the twistlocks, at which the gripper is to be aligned with the corner fitting, based on the first position of the corner fitting and a position correction parameter representative of a predictive displacement of the corner fitting within a predetermined response time of the robot; and send the handling position to the robot such that the gripper moves to the handling position to handle the one of the twistlocks during the moving of the vehicle.

According to embodiments of the present disclosure, due to the use of vision-based control technology and position correction technology, the robot can locate the corner fitting on the container in real-time. Hence, the robot has abilities to track and handle the twistlocks on a moving vehicle. Moreover, only one robot is needed at each side of the moving vehicle to handle the corresponding twistlocks at each side of the vehicle. Compared with the conventional solution for handling the twistlocks, the number of the robots to be used in the twistlock handling station could be reduced greatly, leading to a lower overall cost. Moreover, the area occupied by the twistlock handling station could also be reduced, improving the overall efficiency of the quay.

In some embodiments, the robot is fixed on ground, or arranged on a movable base, or slidably arranged on a guide rail. With these embodiments, the robot may be arranged at any appropriate sites so as to handle the twistlocks on the vehicle in an efficient way.

In some embodiments, when the robot is arranged on the movable base or slidably arranged on the guide rail, the apparatus further comprises a proximity sensor arranged on the robot and configured to detect a rough position of the vehicle after the vehicle enters into the twistlock handling station. The control unit is further configured to obtain the rough position of the vehicle from the proximity sensor; and cause the robot to move towards the vehicle based on the rough position of the vehicle. With these embodiments, the proximity sensor could get the rough position of the vehicle in the twistlock handling station such that the robot could be guided to move towards the vehicle quickly. In this way, the handling speed of the twistlocks on the vehicle could be further improved and the length of the twistlock handling station could be further reduced.

In some embodiments, the control unit is further configured to cause the robot to move towards a next one of the twistlocks after the handling of the one of the twistlocks is completed. With these embodiments, after the handling of one of the twistlocks is completed, the robot could move towards the next twistlock quickly. In this way, the twistlocks at each side of the vehicle could be handled one after the other rapidly, further improving the handling speed of the twistlocks.

In some embodiments, the position correction parameter is preset. With these embodiments, the vehicle could move at a substantially constant speed in the twistlock handling station. For example, the vehicle could be an automatic container truck running at a constant speed.

In some embodiments, the control unit is further configured to: determine the position correction parameter dynamically based on a speed of the vehicle and the predetermined response time of the robot. With these embodiments, the position correction parameter could be determined dynamically based on the speed of the vehicle. Since the speed of the vehicle is a continuous physical quantity and would not be changed abruptly, it could be supposed as constant in a short time. Thus, the position correction parameter could ensure the robot tracks the corner fitting in real-time.

In some embodiments, the visual sensor is further configured to capture second and third images of the corner fitting prior to capturing the first image of the corner fitting, and the control unit is further configured to: obtain, from the visual sensor, the second and third images of the corner fitting; determine, based on the second and third images respectively, second and third positions of the corner fitting at the moments when the second and third images are captured by the visual sensor; and determine the speed of the vehicle based on the second and third positions of the corner fitting. With these embodiments, the real-time speed of the corner fitting could be determined based on the images obtained by the visual sensor, without the need of any additional sensors.

In some embodiments, the speed of the vehicle is detected by a camera arranged in the twistlock handling station or a GPS device arranged on the vehicle. With these embodiments, the speed of the vehicle could be determined precisely through the use of the camera or the GPS device.

In a second aspect, example embodiments of the present disclosure provide a method for handling twistlocks configured to lock a container onto a vehicle. The method comprises: obtaining, from a visual sensor arranged on a robot, a first image of a corner fitting of the container, wherein the robot comprises a gripper configured to grip one of the twistlocks to be mounted onto or dismounted from the corner fitting, and wherein the visual sensor is configured to capture the first image of the corner fitting when the vehicle is moving in a twistlock handling station; determining, based on the first image, a first position of the corner fitting at the moment when the first image is captured by the visual sensor; determining a handling position of the gripper for the one of the twistlocks, at which the gripper is to be aligned with the corner fitting, based on the first position of the corner fitting and a position correction parameter representative of a predictive displacement of the corner fitting within a predetermined response time of the robot; and sending the handling position to the robot such that the gripper moves to the handling position to handle the one of the twistlocks during the moving of the vehicle.

In some embodiments, the robot is fixed on ground, or arranged on a movable base, or slidably arranged on a guide rail.

In some embodiments, when the robot is arranged on the movable base or slidably arranged on the guide rail, the method further comprises: obtaining a rough position of the vehicle detected by a proximity sensor arranged on the robot after the vehicle enters into the twistlock handling station; and causing the robot to move towards the vehicle based on the rough position of the vehicle.

In some embodiments, the method further comprises: causing the robot to move towards a next one of the twistlocks after the handling of the one of the twistlocks is completed.

In some embodiments, the position correction parameter is preset.

In some embodiments, the method further comprises: determining the position correction parameter dynamically based on a speed of the vehicle and the predetermined response time of the robot.

In some embodiments, the visual sensor is further configured to capture second and third images of the corner fitting prior to capturing the first image of the corner fitting, and the method further comprises: obtaining, from the visual sensor, the second and third images of the corner fitting; determining, based on the second and third images respectively, second and third positions of the corner fitting at the moments when the second and third images are captured by the visual sensor; and determining the speed of the vehicle based on the second and third positions of the corner fitting.

In some embodiments, the speed of the vehicle is detected by a camera arranged in the twistlock handling station or a GPS device arranged on the vehicle.

In a third aspect, example embodiments of the present disclosure provide a system for handling twistlocks, comprising: a computer processor coupled to a computer-readable memory unit, the memory unit comprising instructions that when executed by the computer processor implements the method according to the second aspect of the present disclosure.

In a fourth aspect, example embodiments of the present disclosure provide a computer readable medium having instructions stored thereon, the instructions, when executed on at least one processor, cause the at least one processor to perform the method according to the second aspect of the present disclosure.

DESCRIPTION OF DRAWINGS

Drawings described herein are provided to further explain the present disclosure and constitute a part of the present disclosure. The example embodiments of the disclosure and the explanation thereof are used to explain the present disclosure, rather than to limit the present disclosure improperly.

FIG. 8 illustrates a flowchart of a method for handling twistlocks in accordance with embodiments of the present disclosure; and FIG. 9 illustrates a schematic diagram of a system for handling twistlocks in accordance with embodiments of the present disclosure.

Throughout the drawings, the same or similar reference symbols are used to indicate the same or similar elements.

DETAILED DESCRIPTION OF EMBODIMENTS

Figure 1:
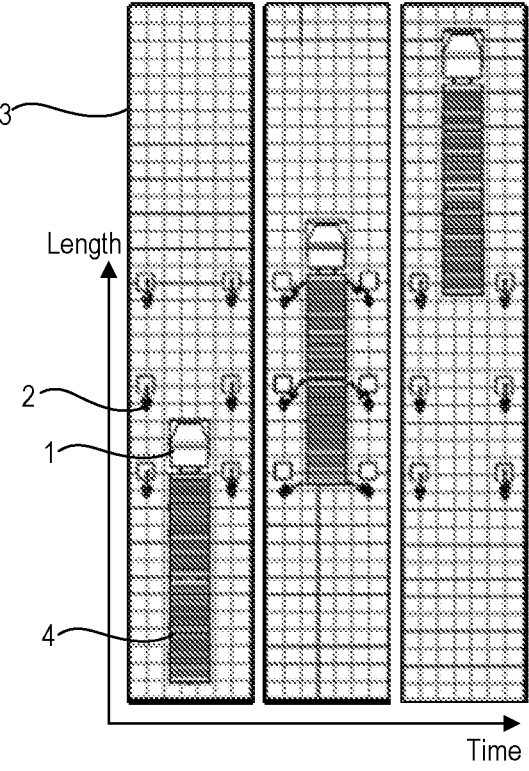
FIG. 1 illustrates a conventional process for handling twistlocks on a vehicle in a twistlock handling station.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below. A definition of a term is consistent throughout the description unless the context clearly indicates otherwise.

As discussed above, in the conventional solution of twistlock handling, each side of the vehicle needs be provided with no less than three robots, which would result in a huge cost; moreover, the conventional twistlock handling station would occupy a large area, which will lead to a large turning circle of the moving path of the vehicle and lower entire quay efficiency. According to embodiments of the present disclosure, to reduce the number of the robots used in the twistlock handling station and the area occupied by the twistlock handling station, the vision-based control technology and position correction technology are used so as to handle the twistlocks when the vehicle is moving in the twistlock handling station. The above idea may be implemented in various manners, as will be described in detail in the following paragraphs.

Figure 2:
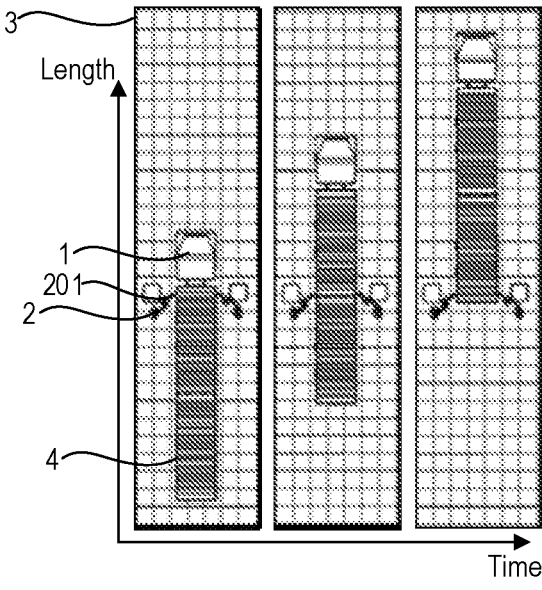
FIG. 2 illustrates an example process for handling twistlocks on the vehicle in the twistlock handling station in accordance with an embodiment of the present disclosure.
Figure 3:
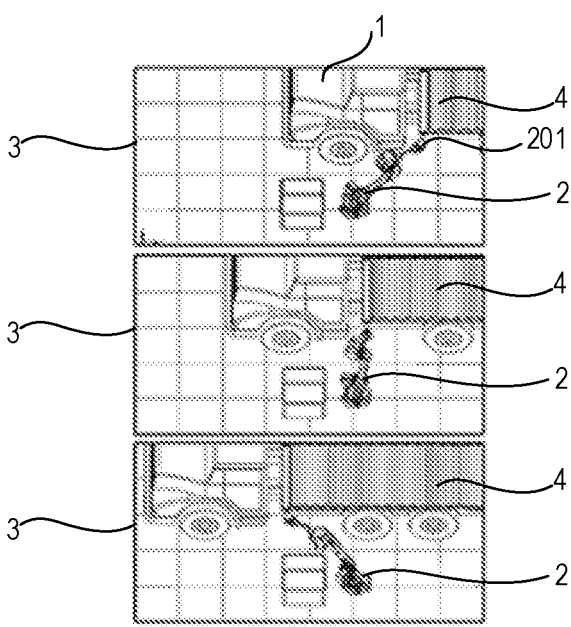
FIG. 3 illustrates an example process for handling a first twistlock on the vehicle in the twistlock handling station in accordance with an embodiment of the present disclosure.

Hereinafter, the principles of the present disclosure will be described in detail with reference to FIGS. 2-9. Referring to FIGS. 2 and 3 first, FIG. 2 illustrates an example process for handling twistlocks on the vehicle 1 in the twistlock handling station 3 in accordance with an embodiment of the present disclosure, and FIG. 3 illustrates an example process for handling a first twistlock on the vehicle 1 in the twistlock handling station 3 in accordance with an embodiment of the present disclosure. The twistlocks are configured to be mated with corner fittings of a container 4 so as to lock the container 4 onto the vehicle 1. The first twistlock is arranged at the front of the vehicle 1, i.e., closer to the head of the vehicle 1 than other twistlocks.

According to embodiments of the present disclosure, a plurality of corner fittings (not shown) are provided at each side of the container 4 so as to receive the corresponding twistlocks and thus lock the container 4 onto the vehicle 1. In some embodiments, the number of the corner fittings at each side of the container 4 may be three, including two side corner fittings to be mated with side twistlocks and one middle corner fitting to be mated with a middle twistlock. In other embodiments, the number of the corner fittings at each side of the vehicle 1 may be more or less than three. The scope of the present disclosure is not intended to be limited in this respect.

As shown in FIGS. 2 and 3, to handle the twistlocks at each side of the container 4, one robot 2 is arranged at each side of the vehicle 1. In some embodiments, the robot 2 may be fixed on the ground or other platforms. The robot 2 may be of any known types or other types available in the future. The robot 2 includes a gripper 201 configured to grip one of the twistlocks to be mounted onto or dismounted from the corner fitting of the container 4. The gripper 20 has the ability to deal with both the side and middle twistlocks.

According to embodiments of the present disclosure, a visual sensor is arranged on the robot 2 to capture a first image of the corner fitting when the vehicle 1 is moving in the twistlock handling station 3. Based on the first image of the corner fitting, the position of the corner fitting could be determined by a control unit, as described in detail hereinafter.

The control unit described herein is configured to obtain the first image of the corner fitting from the visual sensor and determine a first position of the corner fitting based on the first image. The first position refers to the current position of the corner fitting at the moment when the first image is captured by the visual sensor. After the first position of the corner fitting is determined, the gripper 201 needs to handle the corresponding twistlock. In some cases, upon loading the container 4 from the vehicle 1 onto the ship, the gripper 201 would need to grip the twistlock and dismount the twistlock from the corner fitting of the container 4. In some other cases, after the container 4 is unloaded from the ship onto the vehicle 1, the gripper 201 would need to grip the twistlock and mount the twistlock onto the corner fitting of the container 4.

Since the twistlock is moving continuously on the vehicle 1, the gripper 201 would not be able to grip the twistlock successfully at the first position. This is because the twistlock would have reached a next position when the gripper 201 moves to the first position. To avoid that the gripper 201 will always move to a previous position of the twistlock, a predictive position correction may be applied to the first position of the twistlock. Specifically, the control unit may determine a handling position of the gripper 201 for the twistlock to be handled based on the first position of the corner fitting and a position correction parameter. The gripper 201 is to be aligned with the corner fitting at the handling position. In other words, the gripper 201 would be able to insert the twistlock into the corner fitting or grip the twistlock mounted on the corner fitting successfully at the handling position.

The position correction parameter is representative of a predictive displacement of the corner fitting within a predetermined response time of the robot 2. The predetermined response time of the robot 2 refers to the time from the moment when an image is captured by the visual sensor to the moment when the robot 2 arrives at a desired position. When the vehicle 1 is moving slowly and steady in the twistlock handling station 3, the operating speed of the robot 2 is relatively fast with respect to the moving speed of the vehicle 1. Thus, the predetermined response time of the robot 2 may be supposed to be substantially constant.

Then, the control unit may send the handling position to the robot 2. The robot 2 may translate the handling position into angle values of joints of the robot 2. Thereafter, motors of the joints rotate according to the angle values and the gripper 201 moves to the handling position to handle the twistlock during the moving of the vehicle 1.

The robot 2, the visual sensor, and the control unit as described above may form an apparatus for handling the twistlocks. The apparatus for handling the twistlocks is adapted to handle each of the twistlocks at one side of the vehicle 1 one after the other when the vehicle 1 is moving in the twistlock handling station 3. Taking the process of dismounting the twistlocks from the corner fittings as an example, the specific operations of the apparatus may be as below. As shown in the left part of FIG. 2 and FIG. 3, the first twistlock is handled by the robot 2. During the first twistlock is gripped by the gripper 201, the gripper 201 may move together with the first twistlock and implement the handling of the first twistlock. Then, as shown in the central part of FIG. 2, the robot 2 would wait for a second one of the twistlocks to arrive and then handle it. Finally, as shown in the right part of FIG. 2, the robot 2 would wait for a third one of the twistlocks to arrive and then handle it. The specific process of mounting the twistlocks onto the corner fittings is analogous to the process of dismounting the twistlocks as described above, and would not be described in detail herein any more. The twistlocks at the other side of the vehicle 1 may be handled in the similar manner and would not be described in detail herein any more likewise.

Due to the use of vision-based control technology and position correction technology, the robot 2 can locate the corner fitting on the container 4 in real-time. Hence, the robot 2 has the abilities to track and handle the twistlocks on the moving vehicle 1. Moreover, only one robot 2 is needed at each side of the moving vehicle 1 to handle the corresponding twistlocks at each side of the vehicle 1. Compared with the conventional solution for handling the twistlocks, the number of the robots to be used in the twistlock handling station 3 could be reduced greatly, from six to two, leading to a lower overall cost. Moreover, the area occupied by the twistlock handling station 3 could also be reduced. Specifically, the length of the twistlock handling station 3 could be decreased from three times to two times of the length of the container 4, improving the overall efficiency of the quay.

In some embodiments, when the vehicle 1 moves at a substantially constant speed in the twistlock handling station 3, the position correction parameter may be preset. For example, the vehicle 1 could be an automatic container truck running at a constant speed. In these cases, since both the predetermined response time of the robot 2 and the moving speed of the vehicle 1 are substantially constant, the predictive displacement of the corner fitting within the predetermined response time would be substantially constant. Thus, through presetting the position correction parameter, the first position of the corner fitting could be corrected accurately to obtain the actual handling position of the gripper 201.

In some embodiments, when the vehicle 1 is driven by a driver, the moving speed of the vehicle 1 may vary slightly. In these cases, the control unit may be further configured to determine the position correction parameter dynamically based on the speed of the vehicle 1 and the predetermined response time of the robot 2. That is, the speed of the vehicle 1 may be multiplied by the predetermined response time of the robot 2 to obtain the predictive displacement of the corner fitting during the predetermined response time. With these embodiments, the position correction parameter could be determined dynamically based on the speed of the vehicle 1. Since the speed of the vehicle 1 is a continuous physical quantity and would not be changed abruptly, it could be supposed as constant in a short time. Thus, the position correction parameter could ensure the robot 2 tracks the corner fitting in real-time. The speed of the vehicle 1 may be determined in various manners, as described in detail hereinafter.

In some embodiments, the visual sensor is further configured to capture second and third images of the corner fitting prior to capturing the first image of the corner fitting. The control unit may obtain the second and third images of the corner fitting from the visual sensor. Then, the control unit determines, based on the second and third images respectively, second and third positions of the corner fitting at the moments when the second and third images are captured by the visual sensor. Then, the control unit determines the speed of the vehicle 1 based on the second and third positions of the corner fitting. Specifically, since the time interval between the capturing of the second and third images is known, the speed of the vehicle 1 may be obtained based on the time interval and the second and third positions of the corner fitting. With these embodiments, the real-time speed of the corner fitting could be determined based on the images obtained by the visual sensor, without the need of any additional sensors.

In an embodiment, the speed of the vehicle 1 is detected by a camera arranged in the twistlock handling station 3. The camera may collect real-time images of the vehicle 1 and send them to the control unit. Then, the control unit may determine the speed of the vehicle 1 based on the collected real-time images. In another embodiment, the speed of the vehicle 1 is detected by a GPS device arranged on the vehicle 1. With these embodiments, the speed of the vehicle 1 could be determined precisely through the use of the camera or the GPS device. In other embodiments, the speed of the vehicle 1 may be detected in other manners. The scope of the present disclosure is not intended to be limited in this respect.

Figure 4:
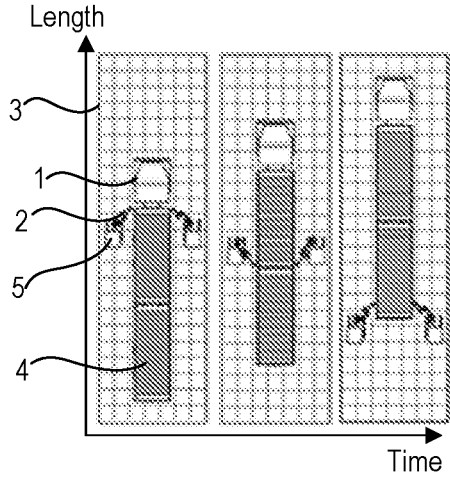
FIG. 4 illustrates an example process for handling twistlocks on the vehicle in the twistlock handling station in accordance with an embodiment of the present disclosure.
Figure 5:
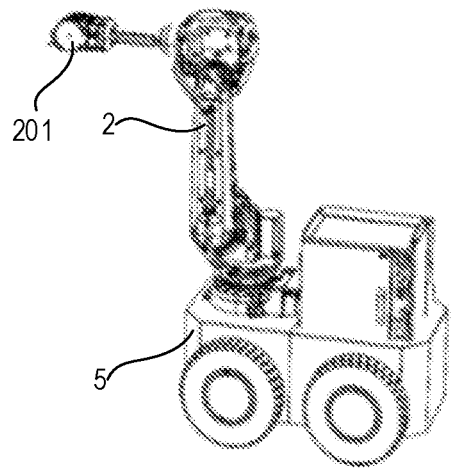
FIG. 5 illustrates a schematic diagram of a robot arranged on a movable base in accordance with an embodiment of the present disclosure.
Figure 6:
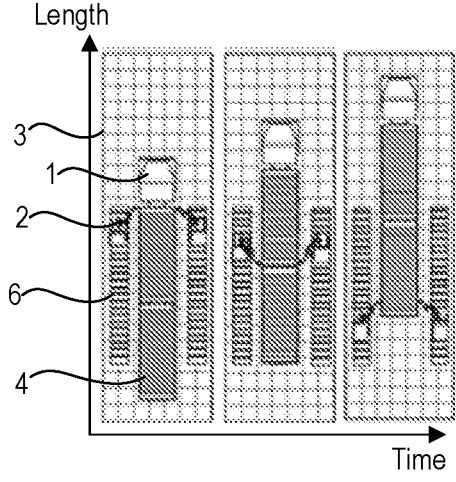
FIG. 6 illustrates an example process for handling twistlocks on the vehicle in the twistlock handling station in accordance with an embodiment of the present disclosure.
Figure 7:
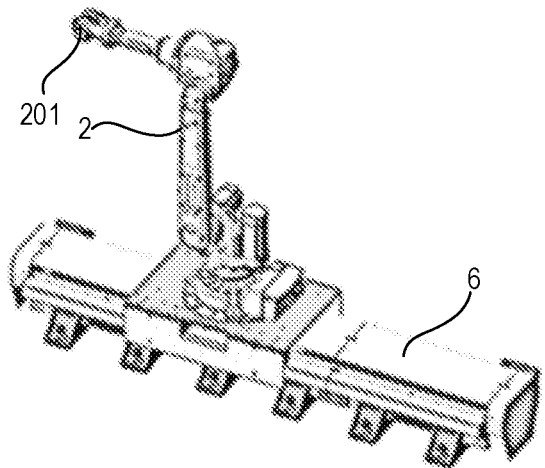
FIG. 7 illustrates a schematic diagram of a robot arranged on a guide rail in accordance with an embodiment of the present disclosure.

In some embodiments, the robot 2 may be movable in the twistlock handling station 3. FIGS. 4-7 illustrate such embodiments of the robot 2. As shown in FIGS. 4 and 5, the robot 2 is arranged on a movable base 5, such as an automated guided vehicle (AGV). As shown in FIGS. 6 and 7, the robot 2 is slidably arranged on a guide rail 6.

When the robot 2 is arranged on the movable base 5, the apparatus for handling twistlocks further comprises a proximity sensor arranged on the robot 2. The proximity sensor is configured to detect a rough position of the vehicle 1 after the vehicle 1 enters into the twistlock handling station 3. Then, the control unit obtains the rough position of the vehicle 1 from the proximity sensor and cause the robot 2 to move towards the vehicle 1 based on the rough position of the vehicle 1. With these embodiments, the proximity sensor could get the rough position of the vehicle 1 in the twistlock handling station 3 such that the robot 2 could be guided to move towards the vehicle 1 quickly. Then, the movable base 5 stands still, and the robot 2 locates, tracks, and handles the twistlock dynamically.

Taking the process of dismounting the twistlocks from the corner fittings as an example, the specific operations of the apparatus may be as below. As shown in the left part of FIG. 4, after the movable base 5 moves near to the first twistlock, the movable base 5 stands still such that the first twistlock is handled by the robot 2. During the first twistlock is handled by the gripper 201, the gripper 201 may move together with the first twistlock and implement the handling of the first twistlock. Then, as shown in the central part of FIG. 4, the robot 2 would move near to a second one of the twistlocks quickly after the handling of the first twistlock is completed, and the robot 2 locates, tracks, and handles the second twistlock dynamically while the movable base 5 stands still. Finally, as shown in the right part of FIG. 4, the robot 2 would move near to a third one of the twistlocks quickly after the handling of the second twistlock is completed, and the robot 2 locates, tracks, and handles the third twistlock dynamically while the movable base 5 stands still. The specific process of mounting the twistlocks onto the corner fittings is analogous to the process of dismounting the twistlocks as described above, and would not be described in detail herein any more. The twistlocks at the other side of the vehicle 1 may be handled in the similar manner and would not be described in detail herein any more likewise.

With the above control technology, the handling speed of the twistlocks on the vehicle 1 could be further improved and the length of the twistlock handling station 3 could be further reduced. Specifically, the length of the twistlock handling station 3 could be decreased from three times to about one time of the length of the container 4, improving the overall efficiency of the quay.

The robot 2 on the movable base 5 could move to anywhere on the port taking the traffic condition on the quay and the berth condition of the ship into account. If one quay has very urgent loading and unloading task, the robot 2 from another free quay can move to the busy quay to support the handling of the twistlocks in the busy quay.

Likewise, when the robot 2 is slidably arranged on the guide rail 6, the apparatus for handling twistlocks further comprises a proximity sensor arranged on the robot 2. The proximity sensor is configured to detect a rough position of the vehicle 1 after the vehicle 1 enters into the twistlock handling station 3. Then, the control unit obtains the rough position of the vehicle 1 from the proximity sensor and cause the robot 2 to move towards the vehicle 1 based on the rough position of the vehicle 1. Then, the movable base 5 stands still on the guide rail 6, and the robot 2 locates, tracks, and handles the twistlock dynamically.

Taking the process of dismounting the twistlocks from the corner fittings as an example, the specific operations of the apparatus for handling twistlocks may be as below. As shown in the left part of FIG. 6, after the robot 2 moves near to the first twistlock on the guide rail 6, the robot 2 stands still such that the first twistlock is handled by the robot 2. During the first twistlock is handled by the gripper 201, the gripper 201 may move together with the first twistlock and implement the handling of the first twistlock. Then, as shown in the central part of FIG. 6, the robot 2 would move near to a second one of the twistlocks on the guide rail 6 quickly after the handling of the first twistlock is completed, and the robot 2 locates, tracks, and handles the second twistlock dynamically while the robot 2 stands still. Finally, as shown in the right part of FIG. 6, the robot 2 would move near to a third one of the twistlocks on the guide rail 6 quickly after the handling of the second twistlock is completed, and the robot 2 locates, tracks, and handles the third twistlock dynamically while the robot 2 stands still. The specific process of mounting the twistlocks onto the corner fittings is analogous to the process of dismounting the twistlocks as described above, and would not be described in detail herein any more. The twistlocks at the other side of the vehicle 1 may be handled in the similar manner and would not be described in detail herein any more likewise.

Example embodiments of the present disclosure also provide a method for handling twistlocks. FIG. 8 illustrates a flowchart of a method 800 for handling twistlocks in accordance with embodiments of the present disclosure. The method 800 comprises: at 810, obtaining, from a visual sensor arranged on a robot, a first image of a corner fitting of the container, wherein the robot comprises a gripper configured to grip one of the twistlocks to be mounted onto or dismounted from the corner fitting, and wherein the visual sensor is configured to capture the first image of the corner fitting when the vehicle is moving in a twistlock handling station; at 820, determining, based on the first image, a first position of the corner fitting at the moment when the first image is captured by the visual sensor; at 830, determining a handling position of the gripper for the one of the twistlocks, at which the gripper is to be aligned with the corner fitting, based on the first position of the corner fitting and a position correction parameter representative of a predictive displacement of the corner fitting within a predetermined response time of the robot; and at 840, sending the handling position to the robot such that the gripper moves to the handling position to handle the one of the twistlocks during the moving of the vehicle.

In some embodiments, the robot is fixed on ground, or arranged on a movable base, or slidably arranged on a guide rail.

In some embodiments, when the robot is arranged on the movable base or slidably arranged on the guide rail, the method further comprises: obtaining a rough position of the vehicle detected by a proximity sensor arranged on the robot after the vehicle enters into the twistlock handling station; and causing the robot to move towards the vehicle based on the rough position of the vehicle.

In some embodiments, the method further comprises: causing the robot to move towards a next one of the twistlocks after the handling of the one of the twistlocks is completed.

In some embodiments, the position correction parameter is preset.

In some embodiments, the method further comprises: determining the position correction parameter dynamically based on a speed of the vehicle and the predetermined response time of the robot.

In some embodiments, the visual sensor is further configured to capture second and third images of the corner fitting prior to capturing the first image of the corner fitting, and the method further comprises: obtaining, from the visual sensor, the second and third images of the corner fitting; determining, based on the second and third images respectively, second and third positions of the corner fitting at the moments when the second and third images are captured by the visual sensor; and determining the speed of the vehicle based on the second and third positions of the corner fitting.

In some embodiments, the speed of the vehicle is detected by a camera arranged in the twistlock handling station or a GPS device arranged on the vehicle.

In some embodiments of the present disclosure, a system 900 for handling twistlocks is provided. FIG. 9 illustrates a schematic diagram of the system 900 for handling twistlocks in accordance with embodiments of the present disclosure. As illustrated in FIG. 9, the system 900 may comprise a computer processor 910 coupled to a computer-readable memory unit 920, and the memory unit 920 comprises instructions 922. When executed by the computer processor 910, the instructions 922 may implement the method for handling twistlocks as described in the preceding paragraphs, and details will be omitted hereinafter.

In some embodiments of the present disclosure, a computer readable medium for handling twistlocks is provided. The computer readable medium has instructions stored thereon, and the instructions, when executed on at least one processor, may cause at least one processor to perform the method for handling twistlocks as described in the preceding paragraphs, and details will be omitted hereinafter.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While some aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2-8. Generally, program modules include routines, programs, libraries, objects, classes, components, data structures, or the like that perform particular tasks or implement particular abstract data types. The functionality of the program modules may be combined or split between program modules as ideal in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for handling twistlocks configured to lock a container onto a vehicle, the apparatus comprising:
   a robot comprising a gripper configured to grip one of the twistlocks to be mounted onto or dismounted from a corner fitting of the container;
   a visual sensor arranged on the robot and configured to capture a first image of the corner fitting when the vehicle is moving in a twistlock handling station; and
   a control unit configured to:
      obtain, from the visual sensor, the first image of the corner fitting;
      determine, based on the first image, a first position of the corner fitting at a moment when the first image is captured by the visual sensor;
      determine a handling position of the gripper for the one of the twistlocks, at which the gripper is to be aligned with the corner fitting, based on the first position of the corner fitting and a position correction parameter representative of a predictive displacement of the corner fitting within a predetermined response time of the robot; and
      move the robot to the handling position to handle the one of the twistlocks during the moving of the vehicle.

2. The apparatus according to claim 1, wherein the robot is fixed on ground, or arranged on a movable base, or slidably arranged on a guide rail.

3. The apparatus according to claim 2, wherein when the robot is arranged on the movable base or slidably arranged on the guide rail, the apparatus further comprises a proximity sensor arranged on the robot and configured to detect a rough position of the vehicle after the vehicle enters into the twistlock handling station, and
   wherein the control unit is further configured to:
      obtain the rough position of the vehicle from the proximity sensor; and
      cause the robot to move towards the vehicle based on the rough position of the vehicle.

4. The apparatus according to claim 3, wherein the control unit is further configured to:

cause the robot to move towards a next one of the twistlocks after the handling of the one of the twistlocks is completed.

5. The apparatus according to claim 1, wherein the position correction parameter is preset.

6. The apparatus according to claim 1, wherein the control unit is further configured to:

determine the position correction parameter dynamically based on a speed of the vehicle and the predetermined response time of the robot.

7. The apparatus according to claim 6, wherein the visual sensor is further configured to capture second and third images of the corner fitting prior to capturing the first image of the corner fitting, and wherein the control unit is further configured to:
obtain, from the visual sensor, the second and third images of the corner fitting;
determine, based on the second and third images respectively, second and third positions of the corner fitting at the moments when the second and third images are captured by the visual sensor; and
determine the speed of the vehicle based on the second and third positions of the corner fitting.

8. The apparatus according to claim 6, wherein the speed of the vehicle is detected by a camera arranged in the twistlock handling station or a GPS device arranged on the vehicle.

9. A method for handling twistlocks configured to lock a container onto a vehicle, the method comprising:

obtaining, from a visual sensor arranged on a robot, a first image of a corner fitting of the container,
wherein the robot comprises a gripper configured to grip one of the twistlocks to be mounted onto or dismounted from the corner fitting, and
wherein the visual sensor is configured to capture the first image of the corner fitting as the vehicle is moving in a twistlock handling station;
determining, based on the first image, a first position of the corner fitting at a moment the first image is captured by the visual sensor;
determining a handling position of the gripper for the one of the twistlocks, at which the gripper is to be aligned with the corner fitting, based on the first position of the corner fitting and a position correction parameter representative of a predictive displacement of the corner fitting within a predetermined response time of the robot; and
moving the robot to the handling position to handle the one of the twistlocks during the moving of the vehicle.

10. The method according to claim 9, wherein the robot is fixed on ground, or arranged on a movable base, or slidably arranged on a guide rail.

11. The method according to claim 10, wherein the robot is arranged on the movable base or slidably arranged on the guide rail, the method further comprises:

obtaining a rough position of the vehicle detected by a proximity sensor arranged on the robot after the vehicle enters into the twistlock handling station; and
causing the robot to move towards the vehicle based on the rough position of the vehicle.

12. The method according to claim 11, further comprising:

causing the robot to move towards a next one of the twistlocks after the handling of the one of the twistlocks is completed.

13. The method according to claim 9, wherein the position correction parameter is preset.

14. The method according to claim 9, further comprising:

determining the position correction parameter dynamically based on a speed of the vehicle and the predetermined response time of the robot.

15. The method according to claim 14, wherein the visual sensor is further configured to capture second and third images of the corner fitting prior to capturing the first image of the corner fitting, and wherein the method further comprises:
obtaining, from the visual sensor, the second and third images of the corner fitting;
determining, based on the second and third images respectively, second and third positions of the corner fitting at the moments the second and third images are captured by the visual sensor; and
determining the speed of the vehicle based on the second and third positions of the corner fitting.

16. The method according to claim 14, wherein the speed of the vehicle is detected by a camera arranged in the twistlock handling station or a GPS device arranged on the vehicle.

17. A system for handling twistlocks, comprising: a computer processor coupled to a computer-readable memory unit, the memory unit comprising instructions that when executed by the computer processor implements the method according to claim 9.

18. A non-transitory computer readable medium having instructions stored thereon, the instructions, in response to being executed on at least one processor, cause the at least one processor to perform the method according to claim 9.

* * * * *